(12) United States Patent
Johnson et al.

(10) Patent No.: US 10,017,390 B2
(45) Date of Patent: Jul. 10, 2018

(54) POLYCRYSTALLINE DIAMOND BODIES INCORPORATING FRACTIONATED DISTRIBUTION OF DIAMOND PARTICLES OF DIFFERENT MORPHOLOGIES

(71) Applicants: DIAMOND INNOVATIONS, INC., Worthington, OH (US); BAKER HUGHES INCORPORATED, Houston, TX (US)

(72) Inventors: Alexanne Johnson, Columbus, OH (US); Andrew Dean Gledhill, Westerville, OH (US); Danny Eugene Scott, Montgomery, TX (US); Marc William Bird, Houston, TX (US)

(73) Assignees: DIAMOND INNOVATIONS, INC., Worthington, OH (US); BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/074,092

(22) Filed: Mar. 18, 2016

(65) Prior Publication Data
US 2016/0289078 A1    Oct. 6, 2016

Related U.S. Application Data

(60) Provisional application No. 62/139,817, filed on Mar. 30, 2015.

(51) Int. Cl.
*B24D 3/02* (2006.01)
*C09C 1/68* (2006.01)
(Continued)

(52) U.S. Cl.
CPC .............. *C01B 31/06* (2013.01); *B24D 3/008* (2013.01); *B24D 18/0009* (2013.01);
(Continued)

(58) Field of Classification Search
None
See application file for complete search history.

(56) References Cited

U.S. PATENT DOCUMENTS 3,141,746 A    7/1964  Lai
3,609,818 A   10/1971  Wentorf
(Continued)

FOREIGN PATENT DOCUMENTS

EP    2049306 B1    7/2013
GB    201305871 B  10/2015
WO    200894190     8/2008

OTHER PUBLICATIONS

Soriano, Mina L. "Separation of a Mixture Distribution Into Its Gaussian Components" ICLARM Contribution No. 456, Apr. 1, 1990, pp. 35-40, Retrieved from the Internet: URL:http://pubs.iclarm.net/Naga/FB_3102_pdf.

*Primary Examiner* — Jennifer A Smith
*Assistant Examiner* — Ross J Christie
(74) *Attorney, Agent, or Firm* — Eric Shaffer

(57) ABSTRACT

Diamond bodies and methods of manufacture are disclosed. Diamond bodies are formed from at least a bimodal, alternatively a tri-modal or higher modal, feedstock having at least one fraction of modified diamond particles with a fine particle size (0.5-3.0 μm) and at least one fraction of diamond particles with coarse particle size (15.0 to 30 μm). During high pressure—high temperature processing, fine particle sized, modified diamond particles in the first fraction preferentially fracture to smaller sizes while preserving the morphology of coarse particle sized diamond particles in the second fraction. Diamond bodies incorporating the two fractions have a microstructure including second fraction diamond particles dispersed in a continuous matrix of first fraction modified diamond particles and exhibit improved (Continued)

wear characteristics, particularly for wear associated with drilling of geological formations.

21 Claims, 8 Drawing Sheets

(51) Int. Cl.
| | | |
|---|---|---|
| *C09K 3/14* | (2006.01) | |
| *C01B 31/06* | (2006.01) | |
| *B24D 3/00* | (2006.01) | |
| *B24D 18/00* | (2006.01) | |
| *C04B 35/52* | (2006.01) | |
| *C22C 26/00* | (2006.01) | |
| *C04B 35/645* | (2006.01) | |
| *C01B 32/25* | (2017.01) | |
| *E21B 10/567* | (2006.01) | |
| *B22F 7/06* | (2006.01) | |
| *B22F 7/08* | (2006.01) | |
| *C22C 29/08* | (2006.01) | |

(52) U.S. Cl.
CPC .............. *C01B 32/25* (2017.08); *C04B 35/52* (2013.01); *C04B 35/645* (2013.01); *C22C 26/00* (2013.01); *B22F 7/06* (2013.01); *B22F 7/08* (2013.01); *C04B 2235/427* (2013.01); *C04B 2235/5296* (2013.01); *C04B 2235/5472* (2013.01); *C22C 29/08* (2013.01); *E21B 10/567* (2013.01)

(56) References Cited

U.S. PATENT DOCUMENTS

| | | | |
|---|---|---|---|
| 3,745,623 | A | 7/1973 | Wentorf et al. |
| 3,850,591 | A | 11/1974 | Wentorf |
| 4,394,170 | A | 7/1983 | Akira et al. |
| 4,403,015 | A | 9/1983 | Tetsuo |
| 4,604,106 | A | 8/1986 | Hall |
| 4,636,253 | A | 1/1987 | Nakai et al. |
| 4,797,326 | A | 1/1989 | Csillag |
| 4,954,139 | A | 9/1990 | Cerutti |
| 5,011,514 | A | 4/1991 | Cho et al. |
| 5,468,268 | A * | 11/1995 | Tank .......................... B01J 3/06 51/307 |
| 5,505,748 | A | 4/1996 | Tank et al. |
| 5,855,996 | A | 1/1999 | Corrigan et al. |
| 7,806,206 | B1 | 10/2010 | Miess |
| 8,182,562 | B2 * | 5/2012 | Dumm ................. C09K 3/1409 51/307 |
| 8,206,474 | B2 | 6/2012 | Tank et al. |
| 8,652,226 | B2 * | 2/2014 | Dumm ................. C01B 25/165 51/307 |
| 8,927,101 | B2 | 1/2015 | Dumm et al. |
| 2004/0238227 | A1 | 12/2004 | Smith et al. |
| 2005/0139397 | A1 * | 6/2005 | Achilles ..................... B22F 7/02 175/434 |
| 2006/0166615 | A1 * | 7/2006 | Tank ......................... B22F 7/06 451/540 |
| 2007/0017710 | A1 * | 1/2007 | Achilles .............. E21B 10/5735 175/432 |
| 2007/0039762 | A1 * | 2/2007 | Achilles ................ B23B 27/148 175/434 |
| 2007/0181348 | A1 * | 8/2007 | Lancaster .............. B24D 18/00 175/432 |
| 2009/0307987 | A1 | 12/2009 | Davies et al. |
| 2010/0043302 | A1 * | 2/2010 | Tank ......................... B24D 3/06 51/307 |
| 2010/0064538 | A1 * | 3/2010 | Scarsbrook ........ B23K 26/0075 33/559 |
| 2010/0064593 | A1 * | 3/2010 | Dumm .................. C09K 3/1409 51/307 |
| 2010/0068974 | A1 * | 3/2010 | Dumm .................. C01B 25/165 51/307 |
| 2011/0031034 | A1 * | 2/2011 | DiGiovanni ......... B24D 99/005 175/428 |
| 2012/0037431 | A1 * | 2/2012 | DiGiovanni ......... E21B 10/5676 175/428 |
| 2012/0102843 | A1 * | 5/2012 | Chakraborty ............ B22F 1/02 51/307 |
| 2013/0180181 | A1 | 1/2013 | Nixon et al. |
| 2014/0123564 | A1 | 5/2014 | Davies et al. |
| 2014/0374172 | A1 | 12/2014 | Gledhill |
| 2015/0013234 | A1 | 1/2015 | Krishnan |
| 2015/0367482 | A1 | 12/2015 | Gledhill |
| 2016/0008955 | A1 | 1/2016 | Gledhill |

\* cited by examiner

POLYCRYSTALLINE DIAMOND BODIES INCORPORATING FRACTIONATED DISTRIBUTION OF DIAMOND PARTICLES OF DIFFERENT MORPHOLOGIES

CROSS-REFERENCE TO RELATED APPLICATIONS

This application claims the benefit of U.S. Provisional Patent Application No. 62/139,817, filed 30 Mar. 2015.

TECHNICAL FIELD AND INDUSTRIAL APPLICABILITY

The present disclosure relates generally to polycrystalline diamond bodies and methods to manufacture such polycrystalline diamond bodies. Specifically, the present disclosure relates to polycrystalline diamond bodies incorporating diamond particles, where the diamond particles are fractionated based on their different morphologies, whether shape, size, texture or surface feature(s).

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Polycrystalline diamond ("PCD") compacts are used in a variety of mechanical applications, for example in material removal or material shaping operations, as bearing surfaces, and in wire-draw operations. PCD compacts are often used in the petroleum industry in the removal of material in downhole drilling. The PCD compacts are formed as cutting elements, a number of which are attached to drill bits, for example, roller-cone drill bits and fixed-cutter drill bits.

PCD cutters typically include a superabrasive diamond layer, referred to as a polycrystalline diamond body, that is attached to a substrate. The polycrystalline diamond body may be formed in a high pressure high temperature (HPHT) process, in which diamond grains are held at pressures and temperatures at which the diamond particles bond to one another.

As is conventionally known, PCD cutters may be the life-critical component of a drilling operation, such that the wear rate and the life of the PCD cutters may affect the time that a drill bit may spend in a material removal application. The wear rate and the life of the PCD cutter may be related to, among others, the abrasion resistance, the thermal stability, and/or the impact toughness of the PCD cutter itself. Similarly, improved physical properties of PCD bodies may be advantageous for alternative end user applications.

Accordingly, PCD bodies having improved physical properties may be desired.

SUMMARY

For polycrystalline diamond bodies, improvement of physical properties such as abrasion resistance and impact toughness may improve performance of the polycrystalline diamond body when used in a variety of material removal or material shaping operations. Improvement of such physical properties may reduce cracking and spalling of the polycrystalline diamond body, thereby reducing the wear rate of the polycrystalline diamond body or increasing the useful life of the polycrystalline diamond body. Thus, there is a need for structures and techniques that improve the characteristics of polycrystalline diamond bodies with respect to one or more of toughness, energy absorption, resistance to cracking, and crack propagation.

In one embodiment, a method of making a diamond body includes forming a diamond feedstock including at least first fraction of modified diamond particles and a second fraction of diamond particles, forming an assembly, wherein the assembly includes a layer of the diamond feedstock arranged in a refractory container, and processing the assembly at elevated temperature and elevated pressure sufficient to sinter the diamond feedstock into the diamond body. The diamond body has a microstructure including second fraction diamond particles dispersed in a continuous matrix including first fraction modified diamond particles and a binder phase. In the diamond feedstock, modified diamond particles in the first fraction have a D50 value of particle sizes of about 0.1 μm to about 3.0 μm and diamond particles in the second fraction have a D50 value of particle sizes of about 10.0 μm to about 40.0 μm.

In another embodiment, a polycrystalline diamond body includes a plurality of diamond grains that are bonded to one another through diamond particle-to-diamond particle bonds. The diamond grains comprise a first fraction and a second fraction. The first fraction has a first median particle distribution D50. The second fraction has a second median particle distribution D50, where the second fraction of diamond grains comprising at least about 60 vol. % of the diamond grains in the diamond body. The second median particle distribution D50 is at least about 7 times the first median particle distribution D50.

In yet another embodiment, a polycrystalline diamond body includes a plurality of diamond grains that are bonded to one another through diamond particle-to-diamond particle bonds. The diamond grains comprise a first fraction and a second fraction. The first fraction has a first median particle distribution D50. The second fraction has a second median particle distribution D50, the second fraction of diamond grains comprising at least about 60 vol. % of the diamond grains in the diamond body. The second median particle distribution D50 is larger than the first median particle distribution D50. The second fraction has a standard deviation of particle size distribution that is from about 1 μm to about 3 μm. The first fraction has a standard deviation of particle side distribution that is greater than about 3 μm.

In yet another embodiment, a polycrystalline diamond body includes a plurality of diamond grains that are bonded to one another through diamond particle-to-diamond particle bonds. The diamond grains comprise a first fraction and a second fraction. The first fraction has a first median particle distribution D50. The second fraction has a second median particle distribution D50. The second fraction of diamond grains comprises at least about 60 vol. % of the diamond grains in the diamond body. The first median particle distribution D50 is less than the second median particle distribution D50. At least about 40% of the first fraction of diamond grains have a sphericity of less than about 0.7. At least about 75% of the second fraction of diamond grains have a sphericity of greater than about 0.8.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

In the polycrystalline diamond bodies, diamond particles with a morphology that includes a coarse particle size is dispersed within a matrix that includes modified diamond particles with a morphology that includes a fine particle size and a binder phase. The fine particle-sized, modified diamond particles constitute a first fraction; the coarse diamond particles having generally larger particle sizes constitute a second fraction. Individual diamond grains of the first fraction and the second fraction are sintered to each other. A binder phase may be present both between the diamond grains of the first fraction and also between the diamond grains of the first fraction and the second fraction. During high pressure high temperature processing, the fine particle-sized modified diamond particles in the first fraction preferentially fracture to smaller sizes while preserving the morphology of the coarse particle-sized diamond particles in the second fraction. Polycrystalline diamond bodies incorporating the two fractions exhibit improved wear characteristics, particularly for wear associated with drilling of geological formations. These and other elements will be discussed in greater detail below.

It is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the end user. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, "about 40" means in the range of 36-44.

Figure 1:
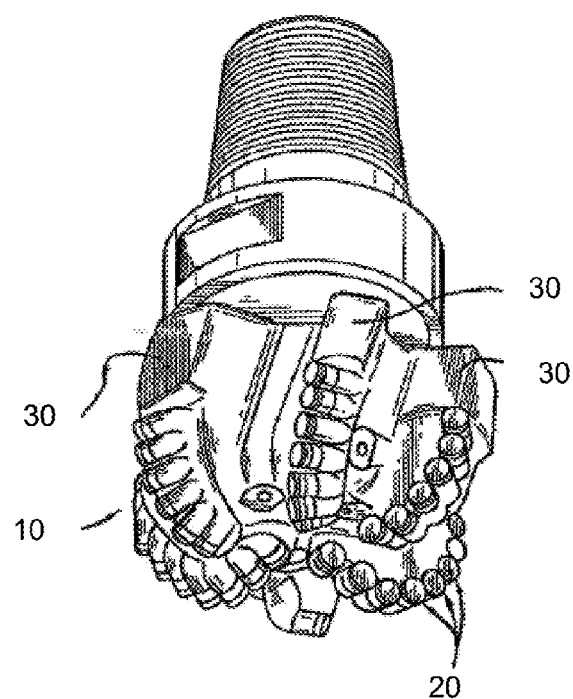
FIG. 1 shows and example of a tool used in the drilling industry, in this case a drill bit having a conventional orientation.
Figure 2A:
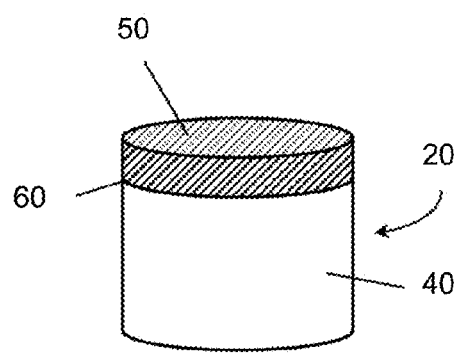
FIG. 2A shows a schematic perspective view of a polycrystalline diamond cutter having a conventional cylindrical shape and FIG. 2B shows a polycrystalline diamond cutter having a conventional cylindrical shape in cross-sectional view and with chamfers or beveled surfaces at an edge of the diamond table.

Tools used in the drilling industry, such as drill bits 10 (see FIG. 1), often incorporate multiple polycrystalline diamond cutters 20 arranged along a periphery region of a fin or blade 30 of the drill bit 10. FIG. 2A shows a schematic perspective view of a polycrystalline diamond cutter 20 having a conventional cylindrical shape. The cutter 20 has a substrate 40, which is made of hard metal, alloy, or composite, and most typically of cemented carbide or cobalt sintered tungsten carbide (WC—Co); and a polycrystalline diamond composite volume 50 (also known as a diamond table or a diamond body) attached or joined coherently to the substrate along the interface 60.

Diamond bodies and polycrystalline diamond cutters with diamond tables can be formed by sintering diamond particles under high pressure and high temperature conditions in the presence of a metal catalyst. Often, the metal catalyst, such as cobalt metal or alloys thereof, is present as a diamond bond-forming aid in high pressure and high temperature (HPHT) manufacturing of the polycrystalline diamond cutter 20. The metal catalyst can originate from an independent source, such as a metal catalyst powder blended into the diamond particles or metal catalyst powder or foil adjacent the diamond particles or from a substrate material. In the presence of the metal catalyst, diamond crystals are bonded to each other in diamond particle-to-diamond particle bonds by a dissolution-precipitation process to form a sintered compact in which a polycrystalline diamond mass, i.e., a diamond table, is formed and that is attached to the substrate (if a substrate is present).

Conventional HPHT conditions include pressures at or above about 4 GPa and temperatures at or above about 1300° C. Details of HPHT manufacturing processes suitable to form a polycrystalline diamond cutter 20 are disclosed in U.S. Pat. Nos. 3,141,746; 3,745,623; 3,609,818; 3,850,591; 4,394,170; 4,403,015; 4,797,326 and 4,954,139, each of which is incorporated herein by reference.

Figure 2B:
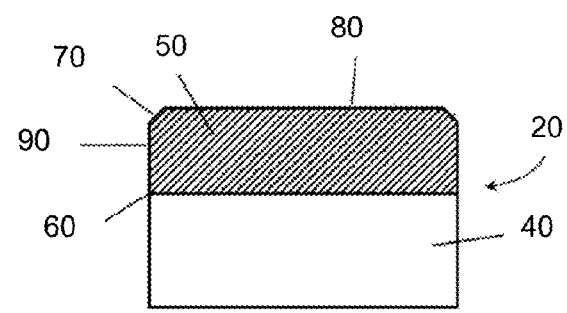

The polycrystalline diamond cutter 20 may be later machined to a desired shape, including machining to specified outer diameter, height and the addition of any chamfers or beveled surfaces. Examples of chamfers or beveled surfaces 70 can be seen in side view in FIG. 2B, along with other surfaces of the polycrystalline diamond cutter 20, such as the top surface 80, and side surface 90. All or portions of the top surface, bevel surface and side surface can be the working surface of the polycrystalline diamond cutter 20, i.e. a surface of the polycrystalline diamond cutter 20 that contacts the geological formation being drilled.

Figures 3A, 3B:
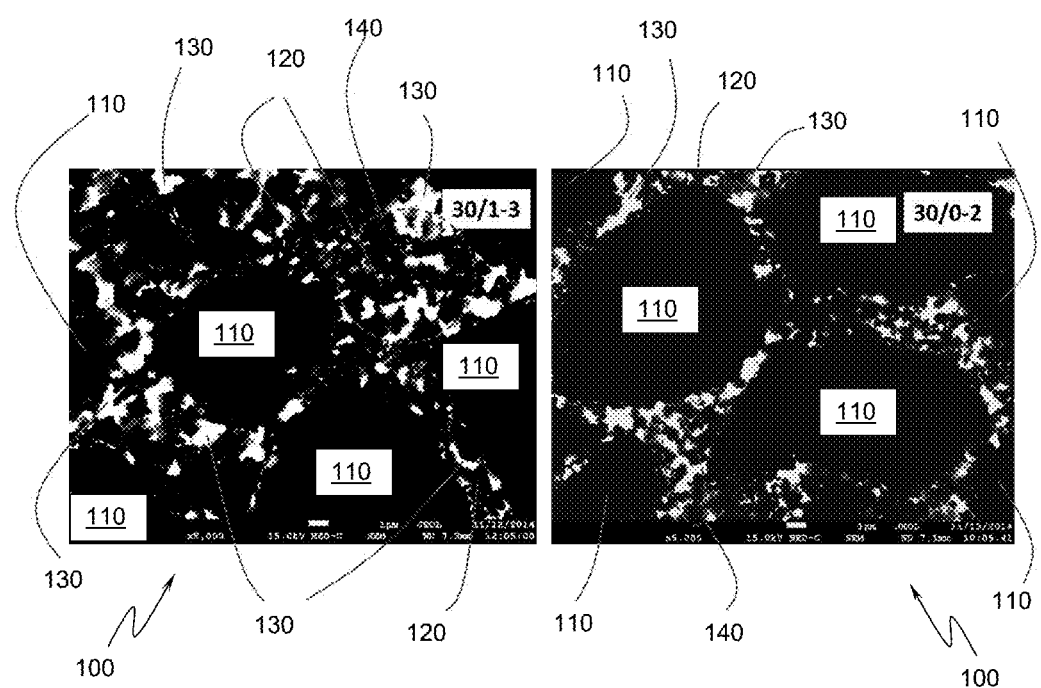
FIG. 3A is a SEM photomicrograph of an exemplary embodiment of a diamond body incorporating two fractions—a first fraction of modified diamond particles with a fine particle size of 2.4 μm (D50 value) and a second fraction of diamond particles with a coarse particle size of 17 μm (D50 value).
FIG. 3B is a SEM photomicrograph of an exemplary embodiment of a diamond body incorporating two fractions—a first fraction of modified diamond particles with a fine particle size of 1 micron (D50 value) and a second fraction of diamond particles with a coarse particle size of 17 μm (D50 value).

FIGS. 3A and 3B are SEM photomicrographs of the microstructure of exemplary embodiments of a diamond body incorporating two fractions of diamond particles. The microstructure 100 in the SEM photomicrographs are both at 5,000× magnification and were obtained at between 5 and 15 keV and 260-300 pA probe current with a composition backscattered detector (Joel 7100/7800 FEG SEM). In FIGS. 3A and 3B, the dark regions are coarse diamond grains of a second fraction or modified diamond grains of a first fraction and the light areas are binder phase. Such diamond bodies are suitable for use as diamond tables in polycrystalline diamond cutters, such as the polycrystalline diamond cutters 20 shown in FIGS. 1, 2A and 2B, or can be used unsupported, i.e., without integral incorporation with a substrate.

The microstructure 100 in the SEM photomicrographs includes coarse particles 110 and fine particles 120. The fine particles 120 and binder phase 130 are distributed throughout a matrix 140. Within the microstructure 100, individual coarse particles 110 are generally separated from each other by the matrix 140, such that individual coarse particles 110 are spaced apart from one another and are not bonded directly to one another. In the embodiment depicted in FIG. 3A, the coarse particles 110 are diamond grains that have a D50 value of particle sizes of about 17 μm. The fine particles 120 of this embodiment are modified diamond particles, which will be described in greater detail below, and have a D50 value of particle sizes of about 1.8 μm. The diamond body of this embodiment was formed from diamond feedstock having a coarse portion with a median particle size D50 of about 17 μm and a fine particle size D50 of about 2.4 μm. In the embodiment depicted in FIG. 3B, the coarse particles 110 are diamond grains that have a D50 value of particle sizes of about 17 μm and the fine particles 120 are modified diamond particles and have a D50 value of particle sizes of about 0.7 μm. The diamond body of this embodiment was formed from diamond feedstock having a coarse portion with a median particle size D50 of about 17 μm and a fine particle size D50 of about 1.0 μm. In exemplary embodiments of the microstructure, the fine particles 120 and the coarse particles 110 constitute a first fraction of modified diamond particles and a second fraction of diamond particles, respectively. In FIG. 3A, the first fraction of fine particles 120 constitutes about 30 vol. % and the second fraction of coarse particles 110 constitutes about 70 vol. %.

Not all individual coarse particles 110, fine particles 120 and binder phase 130 or all regions of the matrix 140 are labeled in the figures, but rather examples of such features are labeled. Also, the labels "30/1-3" and "30/0-2" are sample labels and indicate the following for the sample "vol. % of modified diamond particle/grade of Hyperion™ modified diamond". Diamond feedstock of Hyperion™ 1-3 used to manufacture the sample depicted in FIG. 3A corresponds to a D50 value of particle size of about 2.4 μm; diamond feedstock of Hyperion™ 0-2 used to manufacture the sample depicted in FIG. 3B corresponds to a D50 value of particle size of about 1.0 μm.

As noted above, the matrix 140 that includes the fine particles 120 and the binder phase 130 is continuous throughout exemplary embodiments of the microstructure in the sense that, in a SEM micrograph at 500× magnification, a path consisting only of the matrix 140 can be followed across the field of view shown in the micrograph from one edge of the field of view to an opposite edge of the field of view and that path is continuous. Such a continuous path does not need to be straight, but can, for example, follow a tortuous path. The microstructure is continuous also in the sense that, in a SEM micrograph at 500× magnification, no more than 10%, preferably no more than 5%, and more preferably none, of the coarse particles are in physical contact with each other. Instead, the matrix 140 separates the individual coarse particles 110 from one another.

In embodiments according to the present disclosure, the coarse particles 110 are isolated from each other by a layer of matrix 140. In some embodiments the layer of matrix 140 may be in a range from about 1.2 to about 5 μm. In other embodiments, the layer of matrix is generally in proportion to the modified D50 value of particle sizes of the fine particles 120 evaluated after HPHT processing, such that the layer of matrix 140 includes the fine particles 120 that maintain the separation of the nearest neighbor coarse particles 110.

The diamond bodies in FIGS. 3A and 3B are exemplary in nature. It should be appreciated that variation in D50 value of particle sizes of the first fraction and the second fraction, as well as variations in the vol. % of first fraction and second fraction, may be selected as to retaining characteristics of the microstructure in the polycrystalline diamond body. For example, in other exemplary embodiments, the polycrystalline diamond body is manufactured using a diamond feedstock in which modified diamond particles in the first fraction have a D50 value of particle sizes of about 0.1 μm to about 3.0 μm, including being in a range from about 0.5 μm to about 3.0 μm, and diamond particles in the second fraction have a D50 value of particle sizes of about 10.0 μm to about 40.0 μm, including being in a range from about 10.0 μm to about 20.0 μm, or being in a range from about 20 μm to about 30 μm. On a volume percent basis, the first fraction of modified diamond particles in the diamond feedstock are present in an amount between about 20 vol. % and about 40 vol. %, preferably between about 25 vol. % and about 35 vol. %, most preferably about 30 vol. %. When formed into a diamond body and following HPHT processing, the second fraction of diamond grains has a D50 value of particle sizes in a range from about 10.0 μm to about 40.0 μm, preferably from about 15.0 μm to about 20.0 μm. The modified diamond particles in the first fraction have a D50 value that is less than the D50 value of particle sizes of the modified diamond particles in the first fraction in the diamond feedstock. The D50 value of particle sizes of the diamond particles in the second fraction, as evaluated in the diamond body, may be equivalent to the diamond particles in the diamond feedstock. Preferably, the D50 value of particle sizes of the diamond particles in the second fraction, as evaluated in the diamond body, is the same in the feedstock and in the diamond body. In other embodiments, the D50 value of particles sizes of the diamond particles in the second fraction in the diamond body is within about 5% of the D50 value of the particles sizes of the diamond particles in the feedstock. Although described above in terms of two fractions, i.e., a bi-modal distribution of D50 value of particle sizes, multimodal distributions of D50 value of particle sizes in addition to bi-modal distributions can be used, including for example tri-modal and higher.

Figures 4A, 4B:
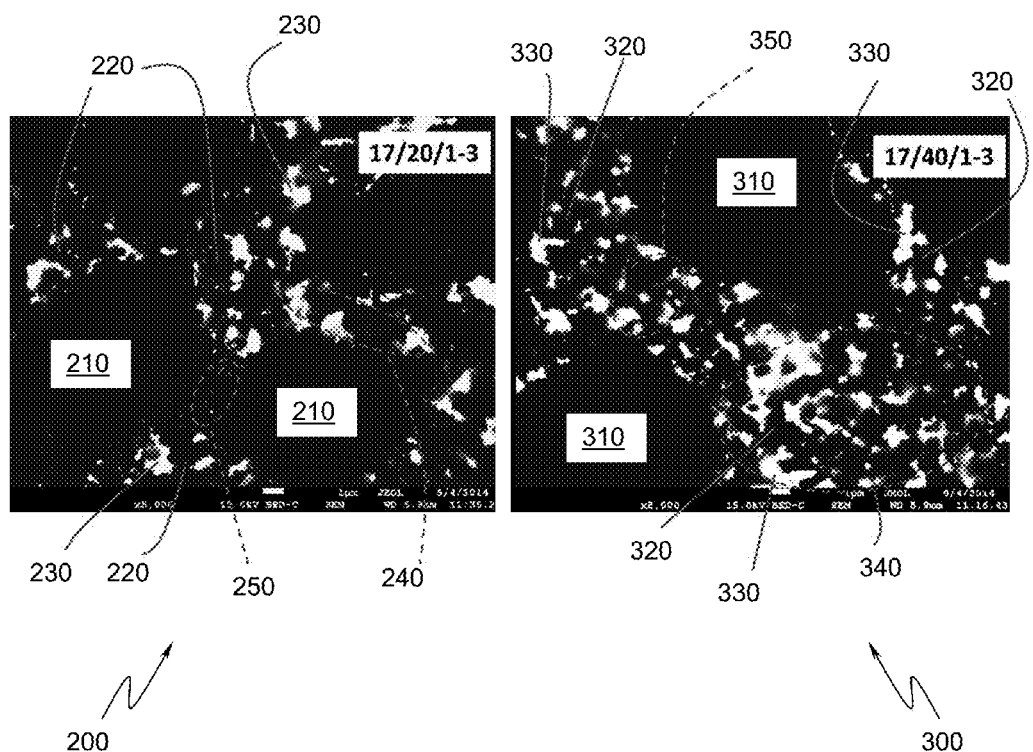
FIGS. 4A and 4B are SEM photomicrographs of the microstructure of exemplary embodiments of a diamond body incorporating two fractions of diamond particles where the vol. % of each fraction has been varied.

Upper and lower limits on the amounts (60 vol. % to 80 vol. %) of coarse particles 110 and fine particles 120 in the microstructure were investigated. FIGS. 4A and 4B are SEM photomicrographs of the microstructure of exemplary embodiments of a diamond body incorporating two fractions of diamond particles. The microstructures 200,300 in the SEM photomicrographs are both at 5,000× magnification and were obtained at between 5 and 15 keV and 260-300 pA probe current with a composition backscattered detector (Joel 7100/7800 FEG SEM). In FIGS. 4A and 4B, the dark regions are coarse diamond grains of a second fraction or modified diamond grains of a first fraction and the light areas are binder phase. The labels "17/20/1-3" and "17/40/1-3" are sample labels and indicate the following for the sample "D50 value of particle size of diamond particle/vol. % of modified diamond particle/grade of Hyperion™ modified diamond". Hyperion™ 1-3 corresponds to a D50 value of particle size of about 2.4 µm.

In general, the exemplary microstructures 200,300 in FIGS. 4A and 4B have many of the same features as the microstructure 100 in FIG. 3A. For example, microstructures 200,300 include coarse particles 210,310 and fine particles 220,320. The fine particles 220,320 and binder phase 230,330 are distributed throughout a matrix 240,340 that extends along the polycrystalline diamond body. Also for example, in both embodiments depicted in FIG. 4A and FIG. 4B, the coarse particles 210,310 are diamond grains that have a D50 value of particle sizes of about 17 µm and the fine particles 220,320 are modified diamond particles that have a D50 value of particle sizes of about 1.8 µm. The fine particles 220,320 constitute a first fraction of modified diamond particles. The coarse particles 210,310 constitute a second fraction of diamond particles.

The amount of modified diamond particles in each diamond body in FIGS. 4A and 4B differ from one another and also differ from that for the diamond body in FIG. 3A. Specifically, in the embodiment depicted in FIG. 4A, the first fraction of fine particles 220 constitutes about 20 vol. % and the second fraction of coarse particles 210 constitutes about 80 vol. %. In comparison, in the embodiment depicted in FIG. 4B, the first fraction of fine particles 320 constitutes about 40 vol. % and the second fraction of coarse particles 310 constitutes about 60 vol. %.

Qualitatively evaluating the microstructure 200 in in the FIG. 4A sample, one observes that some coarse particles 210 are in contact with each other (for example, see region 250). This is due to the amount of modified diamond fine particle fraction being too low and not sufficiently populating the matrix between the coarse particles. Diamond particles 210 exhibiting coarse particle sizes that contact each other in the microstructure 200, as at region 250, is indicative of the diamond particles 210 having sintered together in the HPHT processing to produce diamond particle-to-diamond particle bonding between coarse particles. In exemplary embodiments of diamond bodies, there is no more than 10%, preferably no more than 5%, and more preferably no such diamond particle-to-diamond particle bonding. Based on observations from FIG. 4A, for embodiments in which the coarse particles exhibit a D50 of about 17 and the fine particles exhibit a D50 of about 2.4 µm, 20 vol. % of fine particles may represent a lower bound on the volume percent of modified diamond particles 220 to be included in the feedstock that forms the diamond body.

Turning to the microstructure 300 in FIG. 4B, qualitative evaluation of the microstructure 300 in FIG. 4B shows matrix 340 including modified diamond particles 320 and binder phase 330 between nearest neighbor coarse particles 310. However, in some regions of the microstructure 300 in FIG. 4B (for example, region 350), the thickness of the matrix 340 (and thus the nearest neighbor distance between coarse particles 310) is measured to be about 4.5 µm to about 5.5 µm, i.e., about 5 µm. Region 350 demonstrates qualitatively too much separation between nearest neighbor coarse particles 310. In exemplary embodiments, the minimum separation between nearest neighbor coarse particles 310 has a value that is no less than the D50 value of the modified diamond particles 220 following HPHT processing. In one embodiment, the separation between nearest neighbor coarse particles 310 has a value that is from about 1 to about 3 times the D50 value of particle size of the modified diamond particles 220 following HPHT processing. In the case of the embodiment depicted in FIG. 4B, the microstructure exhibits separation between nearest neighbor coarse particles 310 of about 2.4 µm. This separation distance may be less than the D50 value of particles size of the modified diamond particles in the feedstock (i.e., about 2.4 µm), because the modified diamond particles undergo size reduction during the HPHT processing of the feedstock into the diamond body. For example, such a size reduction may be caused by crushing of the modified diamond particles and/or by consumption of the diamond particles during formation of inter-diamond bonds. Based on observations from FIG. 4B, in the embodiments in which the coarse particles exhibit a D50 of about 17 µm and the fine particles exhibit a D40 of about 2.4 µm, 40 vol. % represents an upper bound on the volume percent of modified diamond particles 320 to be included in the feedstock that forms the diamond body.

For comparison to microstructures in exemplary embodiments disclosed herein, comparison diamond bodies were prepared using a feedstock with a polycrystalline diamond particle having a D50 value of particle size of about 14 µm (FIG. 5A) and about 17 µm (FIG. 5B) (as labeled on the individual photomicrographs). These comparison diamond bodies did not include any modified diamond particles, whether of the same D50 value of particle size or having a different D50 value of particle size, i.e., there was no first fraction of D50 value of particle size. As such, these comparison diamond bodies (FIGS. 5A and 5B) were made from a feedstock that had a single-mode diamond size, rather than a bi-modal distribution of diamond size as in the diamond bodies represented by FIGS. 3AB and 4A-B. In other respects, the comparison diamond bodies (FIGS. 5A and 5B) were prepared substantially the same, if not the same, as the diamond bodies shown and described in connection with FIGS. 3A-B and 4A-B.

Figures 5A, 5B:
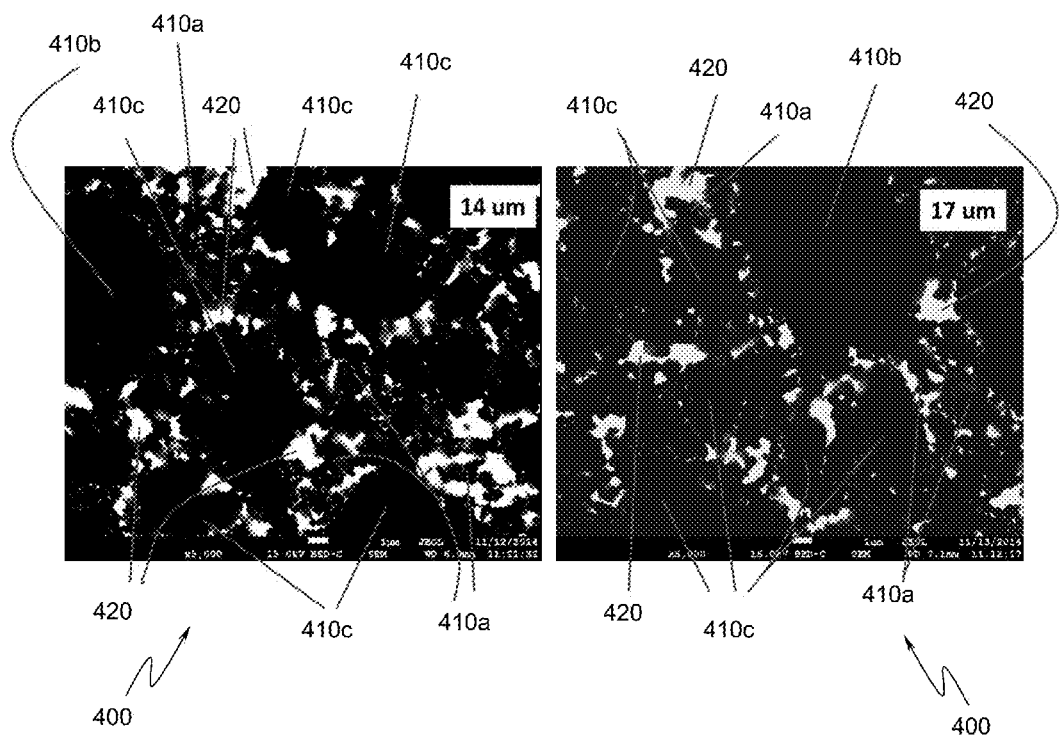
FIGS. 5A and 5B are SEM photomicrographs of the microstructure for two comparison diamond bodies.

FIGS. 5A and 5B depict the microstructure 400 for the two comparison diamond bodies. The SEM photomicrographs in FIGS. 5A and 5B are both at 5,000× magnification and were obtained at between 5 and 15 keV and 260-300 pA probe current with a composition backscattered detector (Joel 7100/7800 FEG SEM).

As observable in FIGS. 5A and 5B, the microstructure 400 has consolidated diamond grains 410a,b,c (dark regions in the photomicrograph) and binder phase 420 (light regions in the photomicrograph). The diamond grains 410a,b,c display a reduction in the D50 values of particle size from the D50 values present in the diamond feedstock. This reduction in the D50 value of particles sizes is evident in that, at the small end of the range of observable particles sizes, there are a first plurality of diamond particles that have a dimension of about 3 µm or less while at the large end of the range of observable particles sizes there are a few diamond particles that have a dimension of about 10 µm. Examples of the first plurality of diamond particles that have a dimension of about 3 µm or less have been labeled 410a and examples of the diamond particles that have a dimension of about 10 µm or greater have been labeled 410b in FIGS. 5A and 5B. It is also observed that there is another plurality of diamond particles that have a size intermediate to the first plurality of diamond particles 410a and second plurality of diamond particles 410b (which are identified as 410c in FIGS. 5A and 5B) Because the distribution of sizes in the microstructures 400 in FIGS. 5A and 5B is inconsistent with the D50 value of particle size in the diamond feedstock, which had a single-mode population diamond size, the distribution in the microstructure 400 necessarily arose in-situ by breaking, cleaving, or fracturing of the diamond particle during manufacture, most likely as a result of the application of high pressure during the HPHT processing.

This in-situ process results in a microstructure 400 that is more random and less ordered than the microstructures 100, 200, 300 depicted in FIGS. 3A-B and 4A-B. Some of differences between the microstructure 400 and exemplary microstructures disclosed herein include:

at least some of the plurality of diamond particles that originally have a dimension of about 10 µm or greater contact each other in microstructure 400, while preferably none of the coarse diamond particles contact each other in exemplary microstructures 100, 200, 300; and the coarse diamond particles in exemplary microstructure 100, 200, 300 retain their D50 value of particle size from that in used in the feedstock, while the diamond particles in microstructure 400 are reduced in size from that used in the feedstock due to breaking, cleaving or fracturing.

Figure 6:
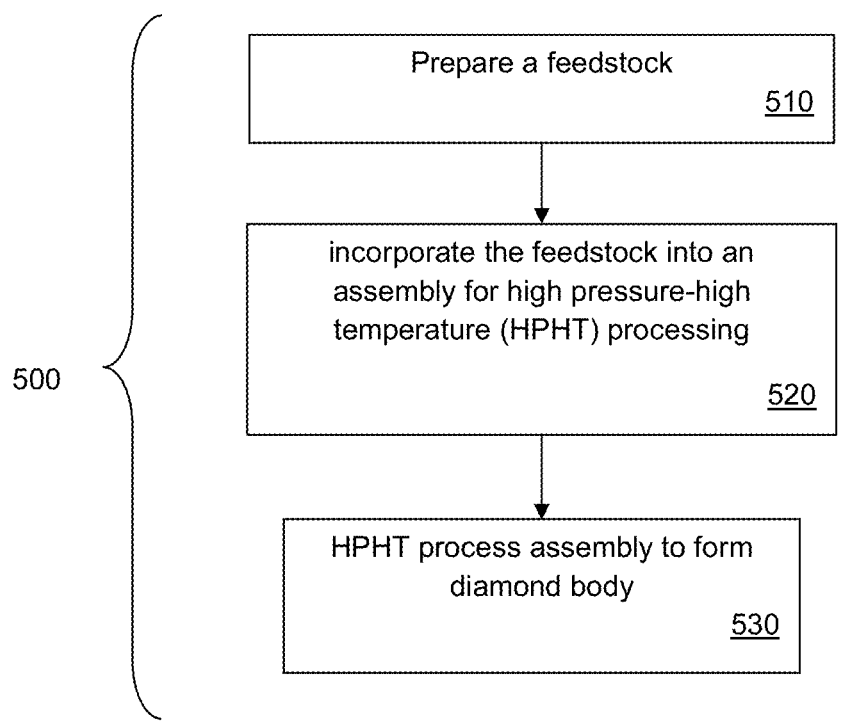
FIG. 6 is a graphical schematic of an exemplary method to manufacture a diamond body.

An exemplary method of manufacture of diamond bodies will now be disclosed, which can be used to manufacture a diamond body having a microstructure consistent with the microstructure 100 disclosed in FIGS. 3A and 3B. FIG. 6 is a graphical schematic of an exemplary method 500 to manufacture a diamond body and includes: preparing a feedstock 510, incorporating the feedstock into an assembly for high pressure-high temperature (HPHT) processing 520; and HPHT processing of the assembly 530.

Preparation of Feedstock:

A feedstock incorporating two or more fractions (by D50 particle size) of monocrystalline diamond particles and modified diamond particles (where at least the fraction with the lowest D50 value of particle size is modified diamond particles) can be made by any suitable method that produces a homogenous mixture. The following is an example of such a method.

Modified diamond particles (representing a first of the two or more fractions) can be dispersed in an alcohol with or without a dispersant. The modified diamond particles in the first fraction can have a D50 value for particle size of about 0.1 to about 3.0 µm. Suitable alcohols include ethanol, isopropyl alcohol, and methanol. Suitable dispersants include electrosteric dispersants.

Monocrystalline diamond particles (representing a second of the two or more fractions) can be added to the modified diamond particles+alcohol and mixed, either ultrasonically or by mechanical agitation, to form a slurry. A suitable length of time for mixing is about 30 minutes. The monocrystalline diamond particles in the second fraction may have a D50 value for particle size from about 10.0 to about 40.0 µm. Overall, for a two fraction or bi-modal feedstock, the modified diamond particles can be present in an amount of between 20 and 40 vol. % and the monocrystalline diamond particles with D50 value for particle size of 15.0 to 35.0 µm can be present as the balance, i.e., 80 to 60 vol. %.

The slurry of modified diamond particles+alcohol+diamond particles can then be dried while agitated. For example, a rotary evaporator or other suitable device can be used to remove the liquid component from the slurry. Once the liquid component is removed, the resulting feedstock can be recovered. The resulting feedstock captured from the mixing process is a well-integrated mixture of the constituents introduced thereto. The powder is ready to be used directly as feedstock in an assembly for high pressure-high temperature (HPHT) processing. Alternatively, the powder can be further processed to include catalytic or non-catalytic additives, which may modify properties of the sintered polycrystalline diamond compact produced by the HPHT process. Examples of such additives may include, but are not limited, to those additives disclosed in U.S. patent application Ser. Nos. 13/926,696, 14/582,542, and 14/582,562, then entire contents of which are hereby incorporated by reference.

The assembly may be formed by arranging the feedstock and a metal catalyst source, which may include an optional support substrate, in a refractory container and sealing the feedstock within the refractory container. The refractory container is typically made from a refractory alloy such as tantalum, zirconium, niobium, molybdenum, palladium, and platinum.

In a first approach, the layer of feedstock is formed in the refractory container by pouring or otherwise adding the feedstock into the interior volume of a refractory container. The diamond feed is distributed in a layer on the bottom of the refractory container and has a desired distribution and thickness based on the desired distribution and thickness of the diamond body in the finished product. In some embodiments, the diamond feed is distributed uniformly in a layer having a thickness of between about 500 µm and about 5 mm.

A metal catalyst source is then arranged in the refractory container. A metal catalyst source may be incorporated into an optional support substrate, through introduction of a foil of metal catalyst, or through both a substrate and a foil.

Exemplary support substrates may be selected from a variety of hard phase materials including, for example, cemented tungsten carbide, cemented tantalum carbide, or cemented titanium carbide. In one embodiment, the support substrate may include cemented tungsten carbide having free carbons, as described in U.S. Provisional Application Nos. 62/055,673, 62/055,677, and 62/055,679, the entire disclosures of which are hereby incorporated by reference. The support substrate may include a pre-determined quantity of catalytic material. Using a cemented tungsten carbide-cobalt system as an example, the cobalt is the catalytic material that is infiltrated into the diamond particles during the HPHT process. In preferred embodiments, the substrate is cobalt sintered cemented tungsten carbide and has a composition of nominally stoichiometric WC with 9-16 wt. % Co. In other embodiments, the assembly may include additional catalytic material (not shown) that is positioned between the support substrate and the diamond particles One or more assemblies can then be loaded into a cell for HPHT processing. Generally, the cell includes pressure transmitting salt that is shaped to generally conform to the outer surfaces of the pre-assembled cup assembly. The cell may also include a resistive heating layer that provides directed heat to the cup assembly during HPHT processing.

Designs of such cell assemblies are conventionally known to those having ordinary skill in the art. The cell is then subjected to HPHT processing conditions sufficient to consolidate and sinter the diamond feed into a polycrystalline diamond body. An example of suitable HPHT processing conditions includes pressure of 4 GPa to 10 GPa, for example 5 GPa to 8 GPa, temperature of greater than 1200° C., for example from about 1300° C. to 1600° C., and a processing time of 2 minutes to about 1 hour, for example from about 10 minutes to about 30 minutes. If a substrate is present, HPHT processing of the assembly metallurgically bonds the polycrystalline diamond body to the substrate. After removing the pressure and allowing the cell to cool, the cell and assembly can be opened and the polycrystalline diamond body (or polycrystalline diamond body metallurgically bonded to the substrate) recovered.

The recovered polycrystalline diamond body (or polycrystalline diamond body metallurgically bonded to the substrate to form a polycrystalline diamond compact) can be further processed to final form. Such processing can include finish grinding of the surfaces, grinding of the diamond body to planarize the top surface of the polycrystalline diamond body and the substrate, grinding to add a bevel or chamfer to the polycrystalline diamond body and/or substrate, rotational grinding to finish grind the cylindrical sides of the polycrystalline diamond body, lapping to polish the top surface of the polycrystalline diamond body, and leaching of the metal catalysts in one or more portions of the polycrystalline diamond body.

It should be appreciated that the above procedures and methods can also be used to prepare polycrystalline diamond bodies based on feedstock that has more than two fractions, i.e., a tri-modal or multimodal feedstock. In which case, at least the fraction with the smallest $D50$ value for particle size is modified diamond particles and at least the fraction with the largest $D50$ value for particle size is monocrystalline diamond particles. Any additional fractions intermediate to the smallest and largest $D50$ value fractions can be either modified diamond or monocrystalline diamond. As an example, a tri-modal feedstock can include (a) a first fraction of less than about 10 vol. %, preferably about 2 vol. % to 8 vol. %, modified diamond particles having a $D50$ value for particle size of about 0.1 µm to about 3.0 µm, preferably about 1.0 to about 2.0 µm; about 20 vol. % to about 40 vol. %, preferably about 25 vol. % to about 35 vol. %, (b) a third fraction of modified diamond particles or monocrystalline diamond particles having a $D50$ value for particle size of about 3.0 µm to about 10.0 µm, preferably about 3.0 µm to about 6.0 µm; and (c) a second fraction of the balance, preferably greater than about 60 vol. %, more preferably about 65 vol. % to about 75 vol. % monocrystalline diamond particles having a $D50$ value for particle size of about 10.0 µm to about 40.0 µm, preferably about 30.0 µm to about 40.0 µm.

Without being bound by any one theory, one or more benefits are associated with the use of feedstock having two or more fractions (by $D50$ particle size) of monocrystalline diamond particles and modified diamond particles (where at least the fraction with the lowest $D50$ value of particle size is modified diamond particles). For example, the uniformly distributed volume of fine modified diamond particles (about 20 to about 40 volume percent of the modified diamond particles with a $D50$ value of particle size of about 0.1 µm to about 3.0 µm) insulate the larger diamond particles in other fractions of the feedstock (for example, monocrystalline diamond particles with a $D50$ value of particle size of about 10.0 µm to about 40.0 µm) from each other during high pressure compaction. This insulating effect substantially limits, if not eliminates, fracture of the coarse diamond particles in the feedstock during HPHT processing that arises from cold compression (a majority of cold compression is believed to occur below about 2 GPa, i.e. during the period the pressure is increasing from the initial application of pressure to the processing pressure of about 4 GPa to about 10 GPa). This preserves large grain integrity and decreases the potential of large grain "pullout" in service. Avoiding large grain pullout increases the operational life of the polycrystalline diamond body.

Figure 7A:
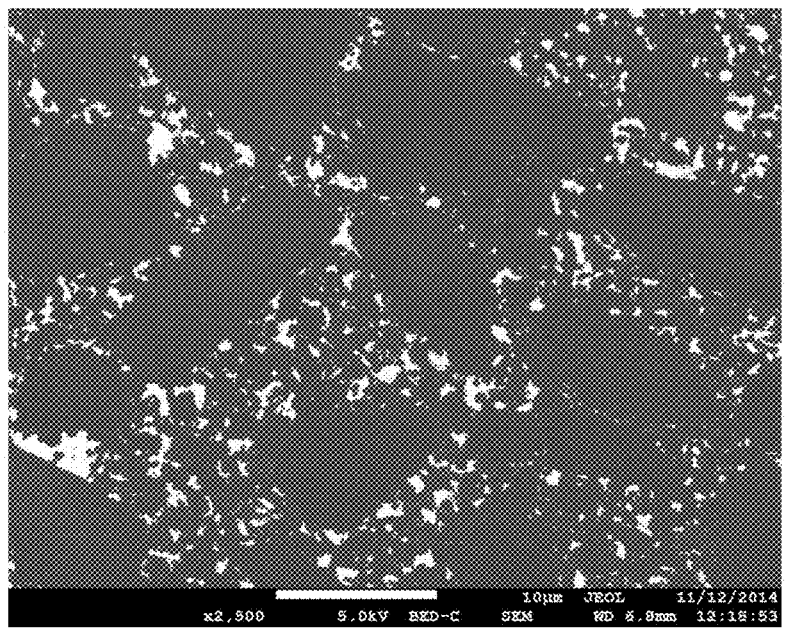
FIGS. 7A and 7B are SEM photomicrographs of the microstructure of two diamond bodies that were evaluated for changes in particle size between the feedstock and the sintered diamond body.
Figure 7B:
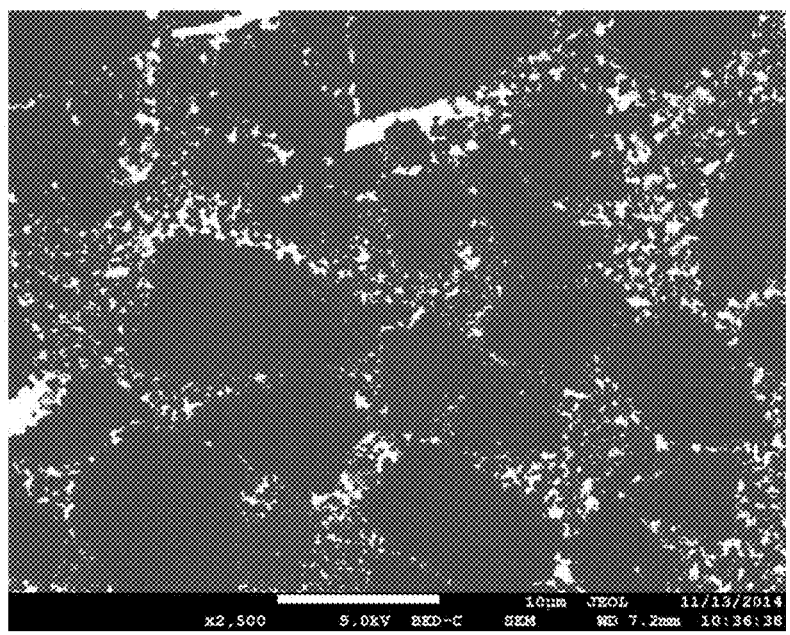

To investigate this insulating effect, two samples were prepared following the above methods. Sample 1 had a feedstock including nominally 60 vol. % monocrystalline diamond particles having a $D50$ value of particle size of 14 µm and nominally 40 vol. % modified diamond particles having a $D50$ value of particle size of 2.4 µm. A SEM photomicrograph of the microstructure 600 of Sample 1 is shown in FIG. 7A. Sample 2 had a feedstock including nominally 60 vol. % monocrystalline diamond particles having a $D50$ value of particle size of 14 µm and nominally 40 vol. % modified diamond particles having a $D50$ value of particle size of 1.0 µm. A SEM photomicrograph of the microstructure 700 of Sample 2 is shown in FIG. 7B. In the microstructure 600, 700, dark regions are coarse fraction diamond or modified diamond particles and the light areas are binder phase.

Figure 8A:
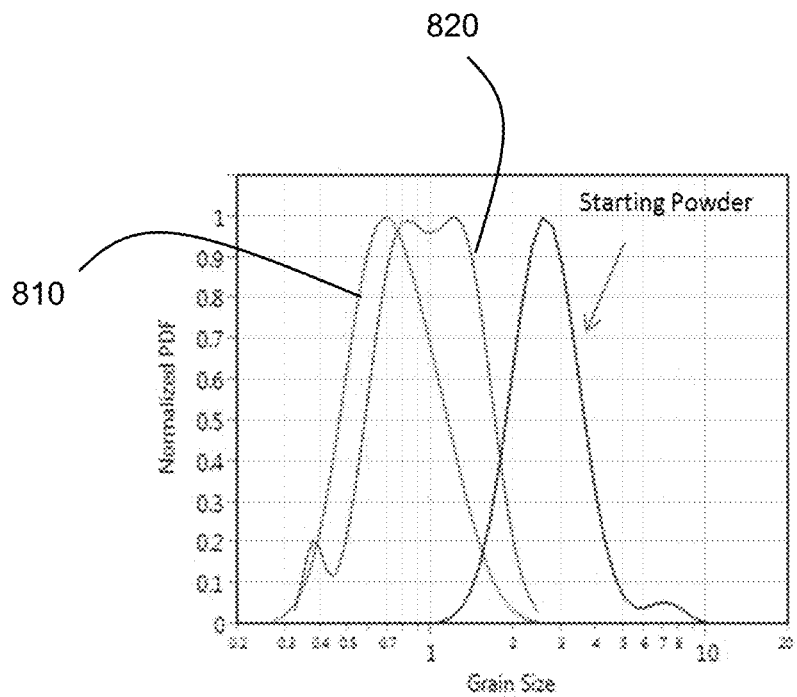
FIGS. 8A and 8B are graphs of normalized probability density function (normalized PDF) as a function of grain size for the two samples in FIGS. 7A and 7B.
Figure 8B:
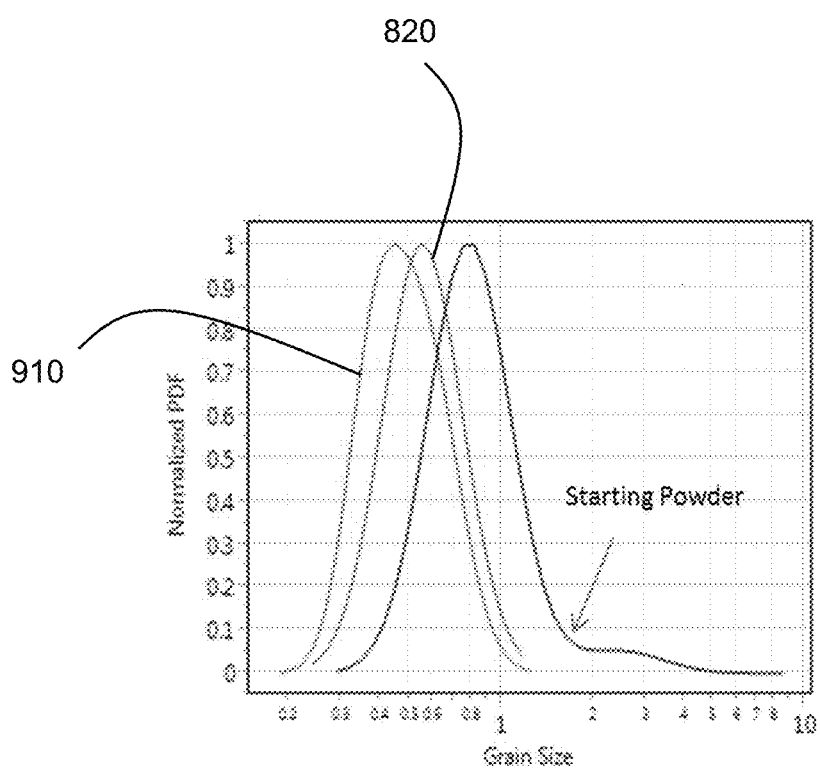

FIGS. 8A and 8B are graphs of normalized probability density function (normalized PDF) as a function of grain size for Sample 1 and Sample 2, respectively. In each of the graphs, the normalized PDF for the starting powder is shown (labeled as "Starting Powder"). For Sample 1, the normalized PDF for the starting powder exhibits a maximum at about 2.5 λm, which correlates to the nominal $D50$ value of particles size for the modified diamond particles of this sample of 2.4 µm. For Sample 2, the normalized PDF for the starting powder exhibits a maximum at about 0.8, which correlates to the nominal $D50$ value of particles size for the modified diamond particles of this sample of 1.0 µm.

Also shown in each graph is the normalized PDF for the modified diamond particle in the sintered diamond body. For Sample 1, normalized PDF 810 and PDF 820 represents the modified particle distribution size following HPHT process when introduced at nominally 40 vol. % (PDF 810) and nominally 30 vol. % (PDF 820) of modified particle introduction. The normalized PDF for the modified diamond particle in the sintered diamond body was obtained from individually tracing the perimeter of each fine fraction grain of the sintered diamond bodies using ImageJ v1.48 image analysis software.

In exemplary embodiments, the $D50$ value of particle size of the modified diamond particles in the feedstock is reduced from the $D50$ value of particle size of the modified diamond particles in the diamond body by at least 1.2 times, preferably at least 1.5 times, more preferably at least 2 times. Based on the graphs in FIGS. 8A and 8B, a ratio of $D50$ values of particle size of the modified diamond particles in the feedstock to $D50$ values of particle size of the modified diamond particles in the diamond body can be determined. For FIG. 8A, the ratio is about 3.6; for FIG. 8B, the ratio is 1.8 (=0.8/X).

Also for example, the fine modified diamond particles (20 to 40 vol. % of the modified diamond particles with a $D50$ value of particle size of 0.1 to 3.0 µm) have a complex surface morphology with numerous, very fine scale (nanometer) asperities/cavities. During HPHT processing these topographic features fracture. Fracture occurs preferentially for modified diamond particles because they are more friable than the monocrystalline, coarse fraction diamond particles. Preferential fracture promotes rearrangement of the particles in the fraction having the smallest D50 value of particle size, i.e., the modified diamond particles, and increases the diamond phase density in the diamond body. It is believe that the introduction of the modified diamond particles allows for a wider area across which force, as introduced by the HPHT process, is distributed over. Therefore, the introduction of the modified diamond particles may reduce stress concentrations in the coarse diamond particles, thereby preserving the size of the coarse diamond particles during HPHT processing. Higher diamond phase density improves compact abrasion and thermal resistance. The microstructures 600 in FIG. 7A is an example of a diamond body that exhibits this behavior in that coarse fraction diamond particles are separated from each other and the modified diamond particles are arranged within the matrix phase between the coarse fraction diamond particles.

Further, introduction of the modified diamond particles having friability that is greater than the friability of the coarse fraction diamond particles promotes crushing of the modified diamond particles, while minimizing crushing and fracturing of the coarse fraction diamond particles. Such preferential crushing and fracturing of smaller diamond particles while minimizing the crushing and fracturing of larger diamond particles promotes maintenance of larger diamond particles. As such, polycrystalline diamond compacts that result from methods disclosed herein may exhibit a greater D50 of the larger diamond grains than conventionally processed polycrystalline diamond compacts that do not include the addition of modified diamond particles. Further, because the larger diamond particles are less likely to crush and fracture in the HPHT process, diamond grains resulting from the larger diamond particles generally form fewer shards and have shapes closer to those of the diamond particles that were introduced to the HPHT process. In contrast, modified, smaller diamond particles have a greater propensity to crush and fracture, and therefore diamond grains resulting from the modified, smaller particles exhibit more irregularity in their shapes following the HPHT process. Accordingly, polycrystalline diamond compacts that result from methods disclosed herein may have diamond grains that were formed from the larger diamond particles, where the diamond grains have a larger particle size and exhibit greater sphericity than diamond grains that were formed from the smaller, modified diamond particles, where the diamond grains have a small particle size and a decreased sphericity. In some embodiments, the sphericity of the larger diamond grains, evaluated in the polycrystalline diamond compact following HPHT processing, is greater than the sphericity of the larger diamond particles, evaluated prior to HPHT processing.

This preferential crushing and fracturing of smaller diamond particles while minimizing crushing and fracturing of larger diamond particles may be in opposite to the effects conventionally exhibited when two fractions of diamond particles are introduced to a HPHT process. In a conventional process in which two fractions of diamond particles having different values of D50 but not exhibiting surface modification discussed hereinabove are mixed with one another, the diamond particles with the larger values of D50 are more likely to crush and fracture during HPHT processing than diamond particles with smaller values of D50. The diamond particles having smaller diameters may exhibit increased toughness as compared to diamond particles having larger diameters. Accordingly, when pressure is introduced to the mixture of diamond particles in the HPHT process, the diamond particles having smaller diameters may apply stress to the diamond particles having larger diameters in concentrated locations, thereby leading to crushing and fracturing of the larger diamond particles and generation of particles with smaller diameters and/or more irregular shapes. In polycrystalline diamond compacts that result from the introduction of such conventional components, diamond grains having larger sizes, evaluated in the polycrystalline diamond compact following HPHT processing, exhibit lower sphericity than the larger diamond particles, evaluated prior to HPHT processing.

Referring again to embodiments according to the present disclosure, fine modified diamond particles have a surface with numerous nanometer scale asperities/cavities. During HPHT processing these topographic features, whether fractured from or attached to the original modified diamond particle, preferentially dissolve in the metal catalyst during HPHT processing (due to their increased surface area exposed to the metal catalyst). Later in the HPHT process, when this dissolved carbon is precipitated as diamond on existing diamond particle surfaces, an increased amount of diamond particle-to-diamond particle bonding is obtained, strengthening the diamond body.

Also, a microstructure for the diamond body with two or more fractions (by D50 particle size) can improve energy absorption (such as from impact) and mitigate internal crack propagation to an edge of the diamond body to thereby reduce instances of portions of the diamond body spalling off of the polycrystalline diamond cutter.

Increased amounts of diamond particle-to-diamond particle bonding and improved energy absorption can be inferred from investigations of wear rates for samples of diamond bodies. Consistent with this, three samples of diamond bodies were manufactured and the wear rate experimentally determined using a vertical turret lathe (VTL) test. All three samples were manufactured consistent with the methods and procedures disclosed herein with Sample A manufactured using feedstock of monocrystalline diamond particles having a D50 value of particle size of 14 µm (i.e., one mode of diamond particle size and no modified diamond particles), Sample B manufactured using feedstock of nominally 40 vol. % modified diamond particles having a D50 value of particle size of 2.4 µm and nominally 60 vol. % of monocrystalline diamond particles having a D50 value of particle size of 14 µm (i.e., a first bi-modal composition), and Sample C manufactured using feedstock of nominally 30 vol. % modified diamond particles having a D50 value of particle size of 2.4 µm and nominally 70 vol. % of monocrystalline diamond particles having a D50 value of particle size of 14 µm (i.e., a second bi-modal composition). The VTL test was run with the cutters positioned with a 15° back-rake angle relative to the work surface. The cutters were positioned at a depth of cut of nominally 0.25 mm. The infeed of the cutters was set to 7.6 mm/revolutions with the workpiece rotating at 60 RPM. The workpiece was made of Barre white granite.

Figure 9:
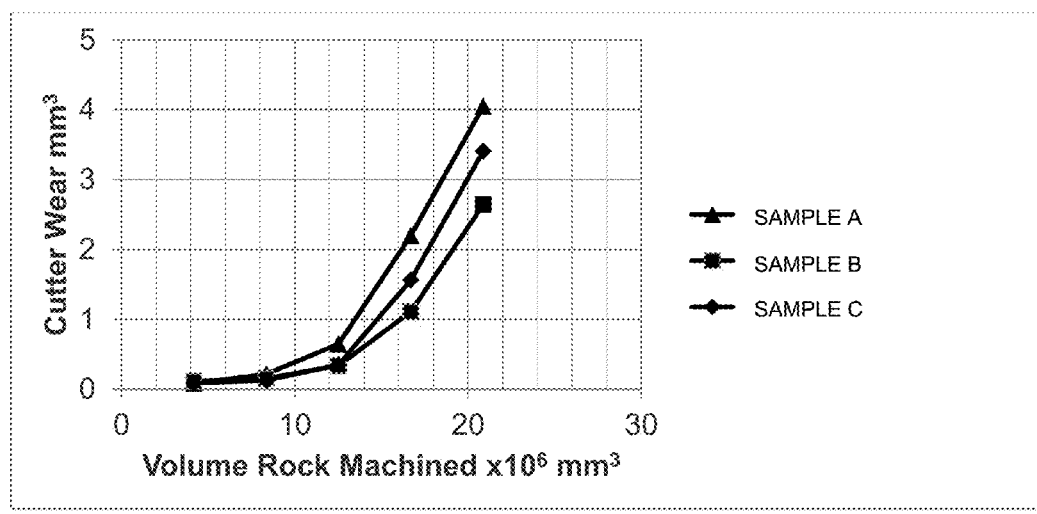
FIG. 9 is a graph is showing results from vertical turret lathe (VTL) testing of two inventive samples and one comparative sample.

FIG. 9 is a graph showing the VTL test results for Sample A, Sample B, and Sample C. Because Sample A did not have any modified diamond particles and had a single distribution of particle sizes, Sample A served as a baseline. As seen in the graph in FIG. 9, the samples that include modified diamond particles (Samples B and C) show reduced cutter wear as a function of volume of rock machined. This reduction in wear for Sample B and Sample C relative to the wear of the baseline is evident at less than $8 \times 10^6$ mm$^3$ volume of rock removed and continues as the volume of rock removed increases. Also evident from FIG. 9, Sample B shows reduced cutter wear relative to Sample C starting at above 12×10$^6$ mm$^3$ volume of rock removed. Further, at above 20×10$^6$ mm$^3$ volume of rock removed, Sample B continues to exhibit a lower wear rate than Sample C, as evident from the lower slope of the curve for Sample B as compared to Sample C in this region of the graph. These results demonstrate that diamond bodies with modified diamond particles have reduced wear rates over diamond bodies without modified diamond particles. Further, when diamond bodies have microstructures that include modified diamond particles, such as the diamond bodies disclosed herein, diamond bodies with 30 vol. % modified diamond particles having a D50 value of particle sizes of 2.4 µm have reduced wear rates over similar diamond bodies with 40 vol. % modified diamond particles having a D50 value of particle sizes of 2.4 µm.

As used herein, modified diamond particles are diamond particles that have been modified to have, variously, spikes and pits and other surface features as disclosed in U.S. Pat. Nos. 8,652,226 and 8,182,562, both of which are incorporated herein in their entirety. Modified diamond exhibits sphericity of less than about 0.70, alternatively about 0.2 to about 0.5 and, alternatively about 0.25 to about 0.4 as determined from an estimate of the enclosed area of a two dimensional image or object (4πA) divided by the square of perimeter (p$^2$). Modified diamond also exhibits surface roughness of less than about 0.95, alternatively about 0.50 to about 0.80 and, alternatively between about 0.50 and about 0.70, which is a measurement of a two-dimensional image that quantifies the extent or degree of pits and spikes of an object's edges or boundaries as stated in the CLEMEX image analyzer, Clemex Vision User's Guide PE 3.5 ©2001 and which is determined by the ratio of the convex perimeter divided by the perimeter. Additionally details of modified diamond, including characteristics, measurement techniques and methods of manufacture are disclosed in U.S. Pat. Nos. 8,652,226 and 8,182,562, both of which are incorporated herein in their entirety. An example of a suitable pitted diamond is commercially available from Diamond Innovations of Worthington, Ohio under the trade name HYPERION™.

As used herein, modified diamond particles exhibit sphericity of greater than about 0.80, alternatively about 0.9 to about 0.95 as determined from an estimate of the enclosed area of a two dimensional image or object (4πA) divided by the square of perimeter (p$^2$). The diamond particles also exhibited a D50 surface roughness of about 0.88, which is a measurement of a two-dimensional image that quantifies the extent or degree of pits and spikes of an object's edges or boundaries as stated in the CLEMEX image analyzer, Clemex Vision User's Guide PE 3.5 ©2001 and which is determined by the ratio of the convex perimeter divided by the perimeter.

Sizes of diamond particles reported herein are D50 values for particle size and were measured using a Microtrac S3500 particle size analyzer running software version 10.6.2 and are reported using volume averaging. For D50 values for particle size of particles in the diamond body, individually tracing the perimeter of each grain perimeter was traced using using ImageJ v1.48 image analysis software and both the equivalent circle diameter and maximum ferret dimension were considered.

The exemplary diamond bodies described and disclosed herein can be incorporated into polycrystalline diamond cutters for drilling tools used, for example, in drilling geological formations. Alternatively, exemplary diamond bodies described and disclosed herein can be incorporated directly into such drilling tools. Examples of drilling tools include drag bits having polycrystalline diamond cutters or diamond bodies arranged along a periphery region of a fin or blade.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method of making a diamond body, the method comprising:
    forming a diamond feedstock including at least first fraction of modified diamond particles and a second fraction of diamond particles;
    forming an assembly, wherein the assembly includes a layer of the diamond feedstock arranged in a refractory container; and
    processing the assembly at elevated temperature and elevated pressure sufficient to sinter the diamond feedstock into the diamond body, the diamond body having a microstructure including second fraction diamond particles dispersed in a continuous matrix including first fraction modified diamond particles and a binder phase,
    wherein, in the diamond feedstock, modified diamond particles in the first fraction have a D50 value of particle sizes of about 0.1 µm to about 3.0 µm and diamond particles in the second fraction have a D50 value of particle sizes of about 10.0 µm to about 40.0 µm,
    wherein the modified diamond particles are more friable than the diamond particles such that, in the diamond body, the modified diamond particles in the first fraction have a D50 value less than the D50 value of particle sizes of the modified diamond particles in the first fraction in the diamond feedstock and the diamond particles in the second fraction have a D50 value of particle sizes that is within about 95% of the D50 value of the particles in the second fraction of the diamond feedstock,
    wherein diamond particles in the second fraction have a surface roughness of less than about 0.5, and a sphericity of greater than about 0.6; and
    wherein the modified diamond particles in the diamond feedstock are present in an amount sufficient such that there is no more than 10% diamond particle-to-diamond particle bonding between the particles of the second fraction in the diamond body.

2. The method of claim 1, wherein the diamond feedstock has a bimodal distribution of particle sizes in which the D50 value of particle sizes of the modified diamond particles in the first fraction is a first mode of the bimodal distribution and the D50 value of particle sizes of the diamond particles in the second fraction is a second mode of a bimodal distribution.

3. The method of claim 2, wherein, in the diamond feedstock, the D50 value of particle sizes of the diamond particles in the second fraction is about 10.0 µm to about 20.0 µm, and wherein, in the diamond body, diamond particles in the second fraction have a D50 value of particle sizes of about 10.0 µm to about 20.0 µm.

4. The method of claim 1, wherein the first fraction of modified diamond particles in the diamond feedstock are present in the amount between about 20 vol. % and about 40 vol. %.

5. The method of claim 1, wherein the diamond feedstock includes a third fraction of diamond particles or of modified diamond particles, and wherein, in the diamond feedstock, particles in the third fraction have a D50 value of particle sizes intermediate to the D50 value of particle sizes in the first fraction and the D50 value of particle sizes in the second fraction.

6. The method of claim 5, wherein the D50 value of particle sizes intermediate to the D50 value of particle sizes in the first fraction and the D50 value of particle sizes in the second fraction is about 3 µm to about 10 µm.

7. The method of claim 5, wherein, in the diamond feedstock, the D50 value of particle sizes of the diamond particles in the second fraction is about 10.0 µm to about 20.0 µm, and wherein, in the diamond body, diamond particles in the second fraction have a D50 value of particle sizes of about 9.0 µm to about 20.0 µm.

8. The method of claim 1, wherein the diamond feedstock includes a third fraction of diamond particles,
wherein, in the diamond feedstock, diamond particles in the third fraction have a D50 value of particle sizes of about 3.0 µm to about 6.0 µm,
wherein, in the diamond feedstock, the D50 value of particle sizes of the diamond particles in the second fraction is about 15.0 µm to about 40.0 µm, and
wherein, in the diamond body, diamond particles in the second fraction have a D50 value of particle sizes of about 14.0 µm to about 40.0 µm.

9. The method of claim 8, wherein the diamond feedstock has the following composition:
less than about 10 vol. %, first fraction,
about 20 vol. % to about 40 vol. %, third fraction, and
balance, second fraction.

10. The method of claim 1, wherein the elevated temperature and the elevated pressure sufficient to sinter the diamond feedstock into the diamond body are from about 4 GPa to about 12 GPa and from about 1200° C. to about 1600° C.

11. The method of claim 1, wherein a majority of the reduction occurs while the pressure is increasing to the elevated pressure.

12. The method of claim 11, wherein a majority of the reduction occurs up to a pressure of about 2 GPa.

13. The method of claim 1, wherein a ratio of D50 values of particle size of the modified diamond particles in the feedstock to D50 values of particle size of the modified diamond particles in the diamond body is at least about 1.2.

14. A method of making a diamond body, the method comprising:
forming a diamond feedstock including at least first fraction of modified diamond particles and a second fraction of diamond particles;
forming an assembly, wherein the assembly includes a layer of the diamond feedstock arranged in a refractory container; and
processing the assembly at elevated temperature and elevated pressure sufficient to sinter the diamond feedstock into the diamond body, the diamond body having a microstructure including second fraction diamond particles dispersed in a continuous matrix including first fraction modified diamond particles and a binder phase,
wherein, in the diamond feedstock, modified diamond particles in the first fraction have a D50 value of particle sizes of about 0.1 µm to about 3.0 µm and diamond particles in the second fraction have a D50 value of particle sizes of about 10.0 µm to about 40.0 µm, and
wherein diamond particles in the second fraction have a surface roughness of less than about 0.5, and a sphericity of greater than about 0.6.

15. The method of claim 1, wherein the assembly includes a substrate and the step of processing the assembly sinters the diamond feedstock into the diamond body and metallurgically bonds the diamond body to the substrate.

16. The method of claim 14, wherein diamond particles in the second fraction have the surface roughness in a range from about 0.2 to less than about 0.5, and the sphericity of greater than about 0.667.

17. The method of claim 14, wherein diamond particles in the second fraction have the sphericity of about 0.667 to about 0.9.

18. The method of claim 4, wherein the first fraction of modified diamond particles in the diamond feedstock are present in the amount between about 25 vol. % and about 35 vol. %.

19. The method of claim 8, wherein the diamond feedstock includes a third fraction of diamond particles,
wherein, in the diamond feedstock, the D50 value of particle sizes of the diamond particles in the second fraction is about 30.0 µm to about 40.0 µm, and
wherein, in the diamond body, diamond particles in the second fraction have a D50 value of particle sizes of about 28.0 µm to about 40.0 µm.

20. The method of claim 9, wherein the diamond feedstock has the following composition:
about 2 vol. % to about 8 vol. % first fraction,
about 25 vol. % to about 35 vol. %, third fraction, and
greater than about 60 vol. % second fraction.

21. The method of claim 20, wherein the diamond feedstock has about 65 vol. % to about 75 vol. % of the second fraction.

* * * * *